Dec. 24, 1957 E. CULLMANN 2,817,409
BATTERY MOUNTING APPARATUS
Filed Oct. 5, 1954

INVENTOR.
Ernst Cullmann
BY Michael S. Striker

United States Patent Office 2,817,409
Patented Dec. 24, 1957

2,817,409

BATTERY MOUNTING APPARATUS

Ernst Cullmann, Frankfurt am Main, Germany

Application October 5, 1954, Serial No. 460,412

Claims priority, application Germany October 10, 1953

2 Claims. (Cl. 180—68.5)

The present invention relates to storage batteries, and in particular to means for mounting storage batteries, used for starting purposes, for example, on land, sea, and air vehicles of all types.

Conventional structure for mounting storage batteries on such vehicles includes clamps which engage the top wall of the casing of the battery so that this casing is compressed and it does not infrequently happen that the pressure of the top wall of the battery casing, particularly at the edge of this top wall, results in rupture of the casing and undesirable loss of the electrolyte.

One of the objects of the present invention is to provide a storage battery mounting arrangement which eliminates the possibility of rupture of the casing of the battery.

Another object of the present invention is to provide a battery casing with an extremely strong portion by which it is connected to the vehicle so as to guarantee the safety of the casing.

A further object of the present invention is to provide an extremely simple and efficient releasable clamping means for releasably clamping a battery casing to a support in a vehicle.

With the above objects in view, the present invention mainly consists of a storage battery mounting apparatus which includes a battery casing having a bottom face and a pair of opposite side walls each of which is provided at a central portion thereof with a projection of dovetail cross section located adjacent the bottom face of the casing and extending therefrom to the top of the casing. A support means carries the casing, and a pair of releasable clamping means are fixed to the support means and engage the projections, respectively, for releasably clamping the casing to the support means.

Figure 1:
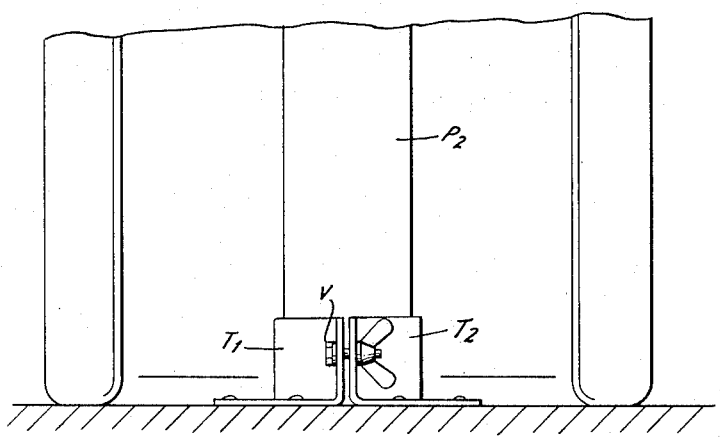
Figure 2:
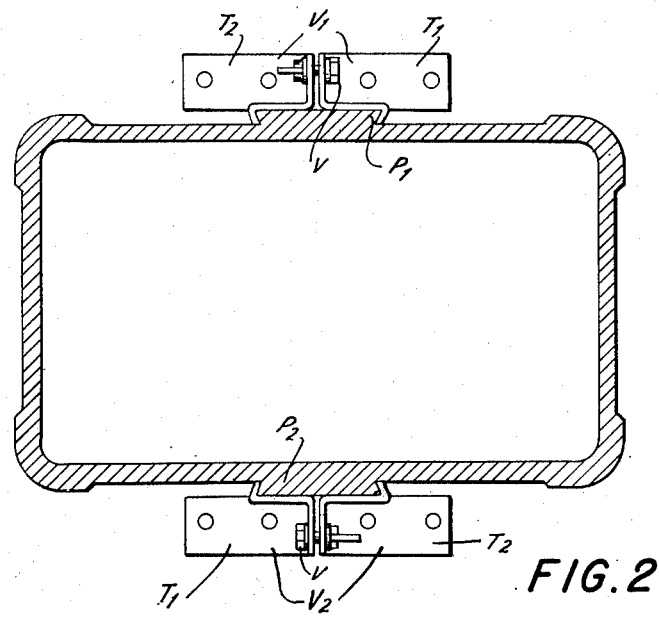

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a fragmentary, side elevational view of a battery mounting arrangement constructed in accordance with the present invention, the support means for the battery being shown diagrammatically in section in Fig. 1; and Fig. 2 is a top plan view illustrating the clamping means of the invention and showing the wall of the battery casing in section.

Referring now to the drawings, it will be seen that the structure of the invention includes a battery casing having a pair of opposite side walls respectively formed with the projections $P_1$ and $P_2$ which, in the illustrated example, are integral with the casing. Each of these projections is of a dovetail cross section and extends from the bottom face of the casing to the top face thereof. Also, each projection is located at a central part of the wall of which it forms a part. Thus, it will be seen that the casing itself is given an increased strength and rigidity by the projections $P_1$ and $P_2$.

In accordance with the present invention the casing is releasably clamped only adjacent its bottom face to the support means which carries the battery casing. Thus, the drawings show a pair of releasable clamping means $V_1$ and $V_2$ fixed to the support means and engaging the projections, respectively, to releasably clamp the battery casing to the support means. As is apparent from the drawings, each of the clamping means includes a pair of separate clamping members $T_1$ and $T_2$ which are fixed to the support means as by being riveted thereto. Each of these clamping members is made of a resilient metal. Fig. 2 shows how each pair of clamping members is provided with clamping portions shaped to correspond to the profile of each projection so that each pair of clamping members respectively engage opposite side faces of the projection with which they are associated. Thus, each of the clamping means includes a pair of base portions fixed alongside one another to the support means, a pair of upwardly extending arms integral with the base portions, respectively, and a pair of clamping arms respectively integral with the upwardly extending arms.

Each pair of clamping members are drawn together into their clamping position by a screw means V. As is apparent from the drawings, each screw means V includes a screw member having a head end engaging one clamping member, extending through aligned openings in each pair of clamping members, and carrying a wing nut so that by manual turning of this nut the battery may be clamped to or released from the support means.

The use of the apparatus of the invention is believed to be self-evident. With the clamping means released it is only necessary to lower the battery in such a way that the projections $P_1$ and $P_2$ become respectively located within the pair of clamping means $V_1$ and $V_2$. Then the wing nuts are tightened to complete the mounting of the battery. The battery may be removed through the reverse of these operations.

Thus, it is evident that the structure of the invention not only is exceedingly simple, but in addition it permits a battery to be mounted on and removed from a vehicle in an extremely short period of time and in a very convenient manner requiring no special tools.

It will be understood that each of the elements described above, or two or more together, may also find a useful application in other types of battery mounts differing from the types described above.

While the invention has been illustrated and described as embodied in an apparatus for releasably clamping a storage battery to a vehicle, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the folowing claims.

What is claimed as new and desired to be secured by Letters Patent is:

1. Storage batery mounting apparatus comprising, in combination, a battery casing having a bottom face and a pair of opposite side walls each of which is provided at a central portion thereof with an integral projection of solid dovetail cross section located adjacent said bottom face and extending therefrom through a substantial distance toward the top of said casing; support means carrying said casing; a pair of clamping members fixed to said support means and respectively engaging opposite side faces of each of said projections only adjacent bottom portions thereof; and screw means operatively connected to each pair of clamping members for drawing the same toward each other to releasably clamp said casing to said support means.

2. Storage battery mounting apparatus comprising, in combination, a battery casing having a bottom face and a pair of opposite side walls each of which is provided at a central portion thereof with an integral projection of solid dovetail cross section located adjacent said bottom face and extending therefrom to the top of said casing; support means carrying said casing; and a pair of releasable clamping means fixed to said support means and engaging said projections only at bottom portions thereof, respectively, for releasably clamping said casing to said support means, each of said clamping means comprising a pair of base portions fixed to said support means alongside one another, a pair of upwardly extending arms integral with said base portions, respectively, a pair of clamping arms integral with said upwardly extending arms, respectively, and extending at right angles thereto so as to be positioned above said base portions respectively, said clamping arms fitting closely around and engaging said integral projection, said pair of upwardly extending arms being spaced from, substantially parallel to, and adjacent one another; and screw means operatively connected to said upwardly extending arms for drawing the same towards each other together with their integral clamping arms so that said projection is thus clamped between said clamping arms.

References Cited in the file of this patent

UNITED STATES PATENTS

| | | |
|---|---|---|
| 1,514,056 | Leitzen | Nov. 4, 1924 |
| 1,555,659 | Gough | Sept. 29, 1925 |
| 1,607,908 | Nelson | Nov. 23, 1926 |
| 2,007,320 | Young | July 9, 1935 |
| 2,461,002 | Riggs | Feb. 8, 1949 |